United States Patent
Younis et al.

(10) Patent No.: US 7,277,414 B2
(45) Date of Patent: Oct. 2, 2007

(54) ENERGY AWARE NETWORK MANAGEMENT

(75) Inventors: Mohamed F. Younis, Ellicott City, MD (US); Moustafa A. Youssef, College Park, MD (US); Khaled A. Arisha, Columbia, MD (US)

(73) Assignee: Honeywell International Inc., Morristown, NJ (US)

( * ) Notice: Subject to any disclaimer, the term of this patent is extended or adjusted under 35 U.S.C. 154(b) by 1037 days.

(21) Appl. No.: 10/208,666

(22) Filed: Jul. 30, 2002

(65) Prior Publication Data

US 2003/0063585 A1 Apr. 3, 2003

Related U.S. Application Data

(60) Provisional application No. 60/309,949, filed on Aug. 3, 2001.

(51) Int. Cl.
*H04Q 7/24* (2006.01)

(52) U.S. Cl. ............... 370/338; 370/311; 370/328

(58) Field of Classification Search ............... None
See application file for complete search history.

(56) References Cited

U.S. PATENT DOCUMENTS

| | | | | |
|---|---|---|---|---|
| 5,850,592 | A * | 12/1998 | Ramanathan | 455/7 |
| 6,208,247 | B1 | 3/2001 | Agre et al. | |
| 6,304,556 | B1 * | 10/2001 | Haas | 370/254 |
| 6,512,935 | B1 * | 1/2003 | Redi | 455/574 |
| 6,735,448 | B1 * | 5/2004 | Krishnamurthy et al. | 455/522 |
| 6,735,630 | B1 * | 5/2004 | Gelvin et al. | 709/224 |
| 6,914,893 | B2 * | 7/2005 | Petite | 370/338 |
| 7,035,240 | B1 * | 4/2006 | Balakrishnan et al. | 370/338 |
| 7,161,926 | B2 * | 1/2007 | Elson et al. | 370/338 |

OTHER PUBLICATIONS

Author: Wenli Chen et al, Title: "ANMP: Ad Hoc Network Management Protocol", Journal on selected areas in communications, IEEE Inc. New York, U.S. vol. 17, No. 8, Aug. 1, 1999, pp. 1506-1531, XP002163743, ISSN: 0733-8716 p. 1506, right-hand column, line 39—p. 1507, left-hand column, line 5 p. 1507, left-hand column, line 6—p. 1507, right-hand column, line 38 Figures 1-3.

Author: Sohrabi K. et al, Title: "Protocols For Self-Organization Of A Wireless Sensor Network" IEEE Personal Communications, IEEE Communications Society, U.S., vol. 7, No. 5, Oct. 2000, pp. 16-27, XP000966620 ISSN: 1070-9916 p. 16, right-hand column, line 33-p. 17, left-hand column, line 32 p. 24, left-hand column, line 25—left hand column, line 18.

(Continued)

*Primary Examiner*—Wing F. Chan
*Assistant Examiner*—Michael J. Moore
(74) *Attorney, Agent, or Firm*—McDonnell Boehnen Hulbert & Berghoff LLP

(57) ABSTRACT

A method of managing a network of sensors in an energy aware manner includes the steps of clustering the sensors to minimize energy consumption, routing the network (step 44), modeling the energy available at each sensor (step 45), and rerouting the network (step 47) when the sensor battery level drops to a predetermined value, or when the energy model is adjusted because it deviates from a sensor's actual energy state.

6 Claims, 9 Drawing Sheets

OTHER PUBLICATIONS

Author: Estrin D et al, Title: "Next Century Challenges: Scalable Coordination In Sensor Networks", MOBICOM '99. Proceedings of the 5th Annual ACM/IEEE International Conference On Mobile ComputinG And Networking. Seattle, WA, Aug. 15-20, 1999, Annual ACM/IEEE International Conference On Mobile Computing and Networking, New York, NY: ACM, U.S., vol. Conf. 5, Aug. 15, 1999, pp. 263-270, XP000896093 ISBN: 1-58113-142-9 The whole document.

* cited by examiner $$COST_{ij} = C0 * (DISTANCE_{ij})^L + C1 * F(ENERGY_j)$$
$$+ C2 * (MAXTIME - T_j) + C3 + C4 + C5$$
$$+ C6 * (DISTANCE_{ij}) + C7 * (OVERALL\ LOAD)$$

FIG. 5

$$CF1 = C0 * (DISTANCE_{ij})^L$$

$$CF2 = C1 * F(ENERGY_j)$$

$$CF3 = C2 * (MAXTIME - T_j)$$

$$CF4 = C3 + C4$$

$$CF5 = C5$$

$$CF6 = C6 * (DISTANCE_{ij})$$

$$CF7 = C7 * (OVERALL\ LOAD)$$

*FIG. 6*

*Input:*
- Gateway Node $g$
- Initially sensing-enabled set of nodes $N$
- Relay Nodes (initially all non-sensor nodes) $R = \forall\ n \notin (N \cup \{g\})$
- Cost functions for each connection between 2 nodes $d_{ij}$
- Initial Distance Function $D_n$ between $g$ and each node $n \in (N \cup R)$

*Output:*
- $T$: Set of routes (node lists) between $g$ and each sensor node of $N$
- $R$: Updated set of routing-enabled nodes = $\forall\ r \in T$

*Algorithm:*
Init: $D_n = \infty$ (Maximum distance)
1. $M = \{g\}$
2. $D_n = d_{gn}$ for each node $n \in (N \cup R)$
3. Find $w \in (N \cup R)$ such that $D_w = min_{j \notin M}[D_j]$
    3.1. add $w$ to $M$
4. Update $D_n = min \forall_n \notin M [D_n, D_w + d_{wn}]$
5. Repeat until $M = N \cup R$

*FIG. 7*

ENERGY AWARE NETWORK MANAGEMENT

RELATED APPLICATION

This application claims the benefit of provisional application No. 60/309,949, filed Aug. 3, 2001.

BACKGROUND OF THE INVENTION

1. Technical Field

The present invention relates to a wireless data network and more specifically to managing energy consumption related to data processing and communication in sensor networks.

2. Background Art

Networking of unattended sensors is expected to have a significant impact on the efficiency of many military and civil applications, such as security and disaster management. These systems process data gathered from multiple sensors to monitor events in an area of interest. Sensors in such systems are typically disposable and expected to last until their energy drains. Therefore, energy is a very scarce resource for such sensor systems and has to be managed wisely in order to extend the life of the sensors for the duration of a particular mission.

Sensors are generally equipped with data processing and communication capabilities. A sensing circuit measures parameters from the environment surrounding the sensor and transforms them into an electric signal. Processing such a signal reveals some properties about objects located and/or events happening in the vicinity of the sensor. The sensor communicates such sensed data, usually via a radio transmitter, to a command center either directly or through a data concentration center (a gateway). The gateway can perform fusion of the sensed data in order to filter out erroneous data and anomalies and to draw conclusions from the reported data over a period of time. For example, in a reconnaissance-oriented sensor network, sensor data indicates detection of a target while fusion of multiple sensor reports are used for tracking and identifying the detected target.

Signal processing and communication activities are the main consumers of sensor's energy. Since sensors are battery-operated, keeping the sensor active all the time will limit the duration that the battery can last. Therefore, optimal organization and management of the sensor network are very crucial in order to perform the desired function with an acceptable level of quality and to maintain sufficient sensor energy to last for the duration of the required mission. Mission-oriented organization of the sensor network enables the appropriate selection of only a subset of the sensors to be turned on and thus avoids wasting the energy of sensors that do not have to be involved.

In wired networks, the emphasis has traditionally been on maximizing end-to-end throughput and minimizing delay. In general, paths are computed to minimize hop count or delay. While wireless networks inherited such design metrics from their wired counterparts, energy constraints and signal interference have become central issues. Signal interference has received the most attention from the research community due to the growing popularity of wireless consumer devices.

There is a need to increase energy efficiency, especially when a network consists of remotely deployed unattended sensors. Previous art has focused on improving hardware-related energy efficiency aspects of wireless communications. Low-power electronics, power-down modes, and energy efficient modulation are examples of work in this category.

Energy-aware routing has started to receive some attention in the recent few years, motivated by advances in wireless mobile devices. Since the overhead of maintaining the routing table for wireless mobile networks is very high, the stability of a route becomes a major concern. It is known that battery power capacity, transmission power, and stability of routes are among the issues to be considered in designing a power efficient routing protocol. Algorithms have been proposed to select the routes such that the nodes' batteries drain-out time is maximized. The reported results have indicated that in order to maximize the lifetime, the traffic should be routed such that the energy consumption is balanced among the nodes in proportion to their energy reserves.

There remains a long-felt need for methods of energy-aware network management that will ensure a desired level of quality-of-service (QoS) for data transfer as well as maintaining the life of the network.

SUMMARY OF THE INVENTION

In contrast to prior efforts to improve energy efficiency, our invention improves the system communication software related to data link layer and network layer protocols. Specifically, our invention manages the topology of a multi-gateway sensor network based on sensor energy consumption and sensor involvement in data collection. The remaining battery life in each sensor is mathematically modeled and the model is updated to reflect the sensor's actual power state. Advantageously, this multiple-gateway architecture is scalable to a very large set of sensors covering a wide geographic even though the individual sensors are typically not capable of long-haul communication. To allow the system to cope with additional load and to be able to cover a large area of interest without degrading the service, our invention utilizes networking clustering with multiple gateways. In a preferred embodiment, given the constrained transmission range of the sensor and due to the need for conserving energy, each gateway is located as close as possible to its sensors.

In accordance with an aspect of our invention, the sensors are arranged in groups, each group being a cluster with its individual gateway, and the interconnections of the sensors in each cluster can be rearranged or rerouted to conserve the energy of individual sensors. Each gateway includes a cluster-wide routing table for the sensors of its cluster and each sensor includes a smaller forwarding table. Thus, certain sensors may be connected directly to the gateway of their cluster while others may be connected to the gateway through other sensors, which connections may be rerouted to conserve energy in the individual sensors. Further, the rerouting may, in certain situations, involve the transfer of a sensor from one cluster and gateway to another cluster and gateway. The gateway of each cluster will take charge of sensor organization and network management based on the mission and available energy in each sensor. Knowing which sensors need to be active in signal processing, the network topology is dynamically adapted to minimize the energy consumed for communication, thus extending the life of the network while ensuring quality of service (QoS) for data transmission.

It is an objective of the present invention to provide multi-hop communication between any sensor and the gateway. Another objective of the invention is to reduce delays resulting from collisions and retransmissions at the link layer.

BRIEF DESCRIPTION OF DRAWINGS

Figure 1:
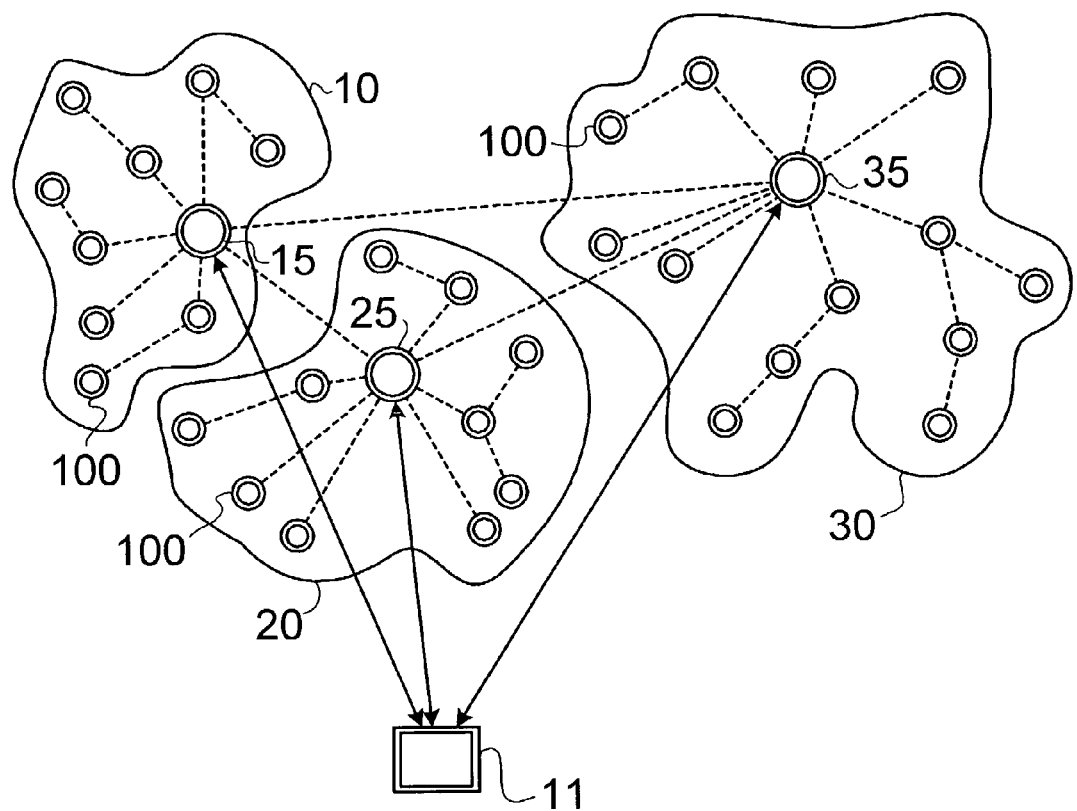

Brief Description of the Several Views of the Drawing

FIG. 1 depicts the architecture of a distributed sensor network including cluster groups in accordance with one specific illustrative embodiment of our invention.

Figure 2:
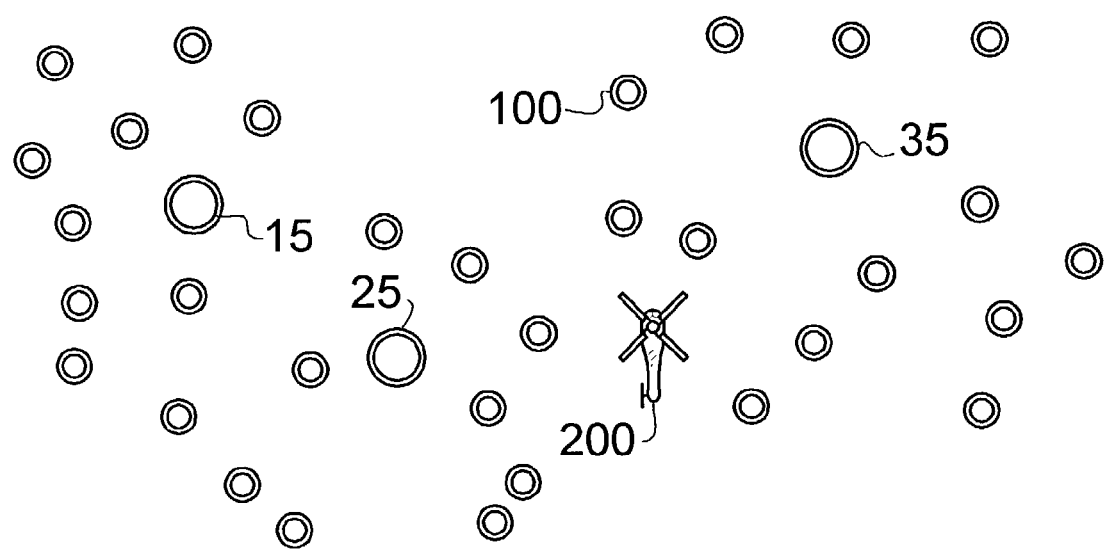

FIG. 2 depicts another view of the sensor network shown in FIG. 1 and a target that is being tracked by the sensors.

Figure 3:
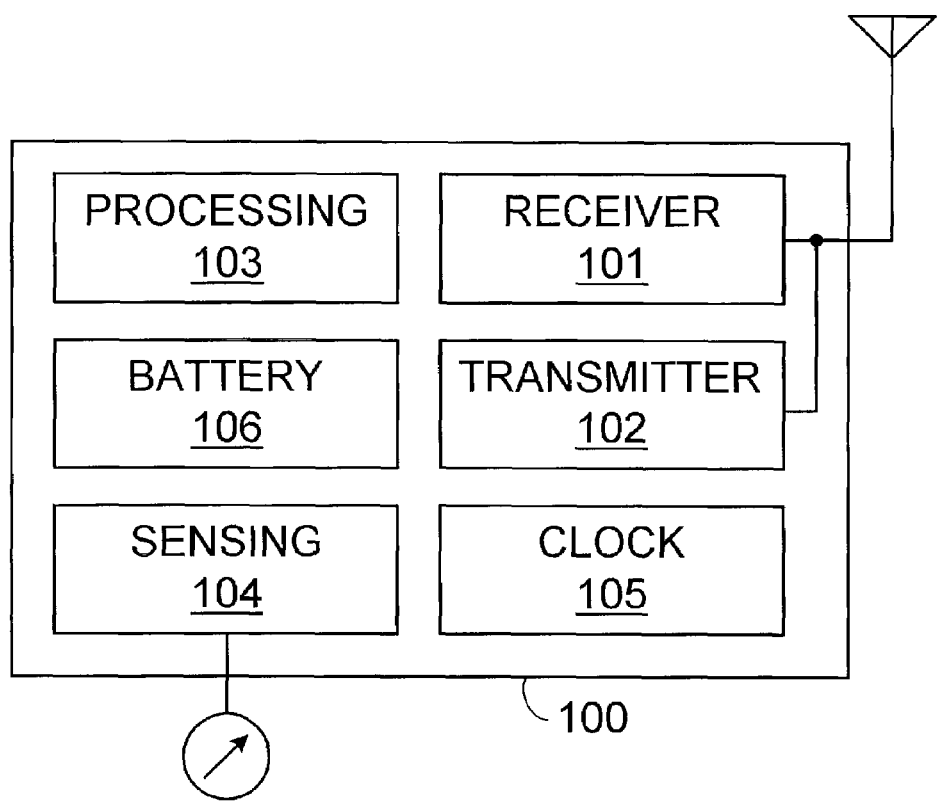

FIG. 3 is a block diagram of a typical sensor that is suitable for use in the sensor network of FIG. 1.

Figure 4:
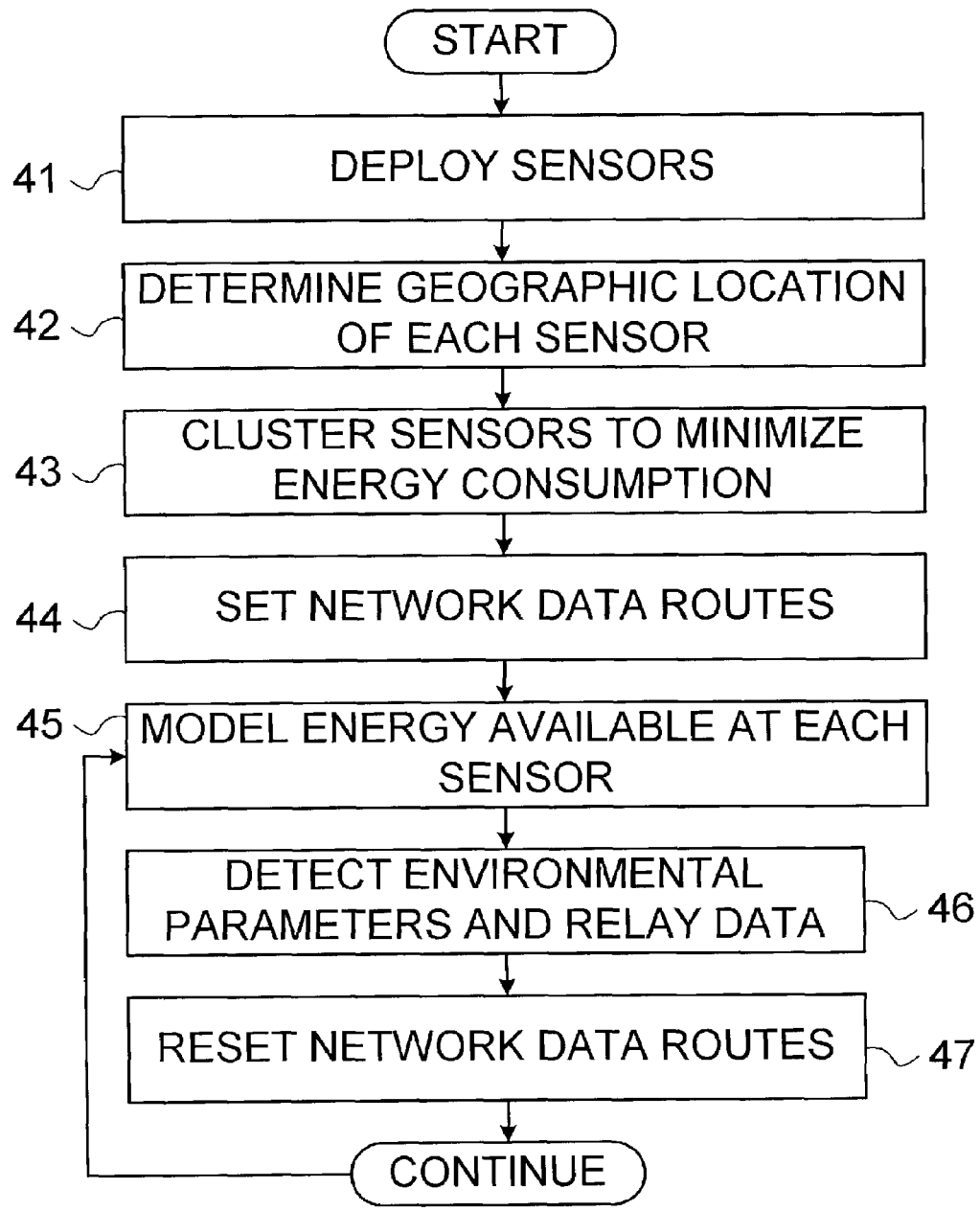

FIG. 4 is a flowchart of the method steps for managing a network in accordance with the present invention.

FIG. 5 shows a total cost equation used in one illustrative embodiment of our invention.

FIG. 6 shows the individual cost factors that make up the total cost equation of FIG. 5.

FIG. 7 depicts a mathematical algorithm for determining the least cost route for a network that is suitable for certain embodiments of our invention.

Figure 8:
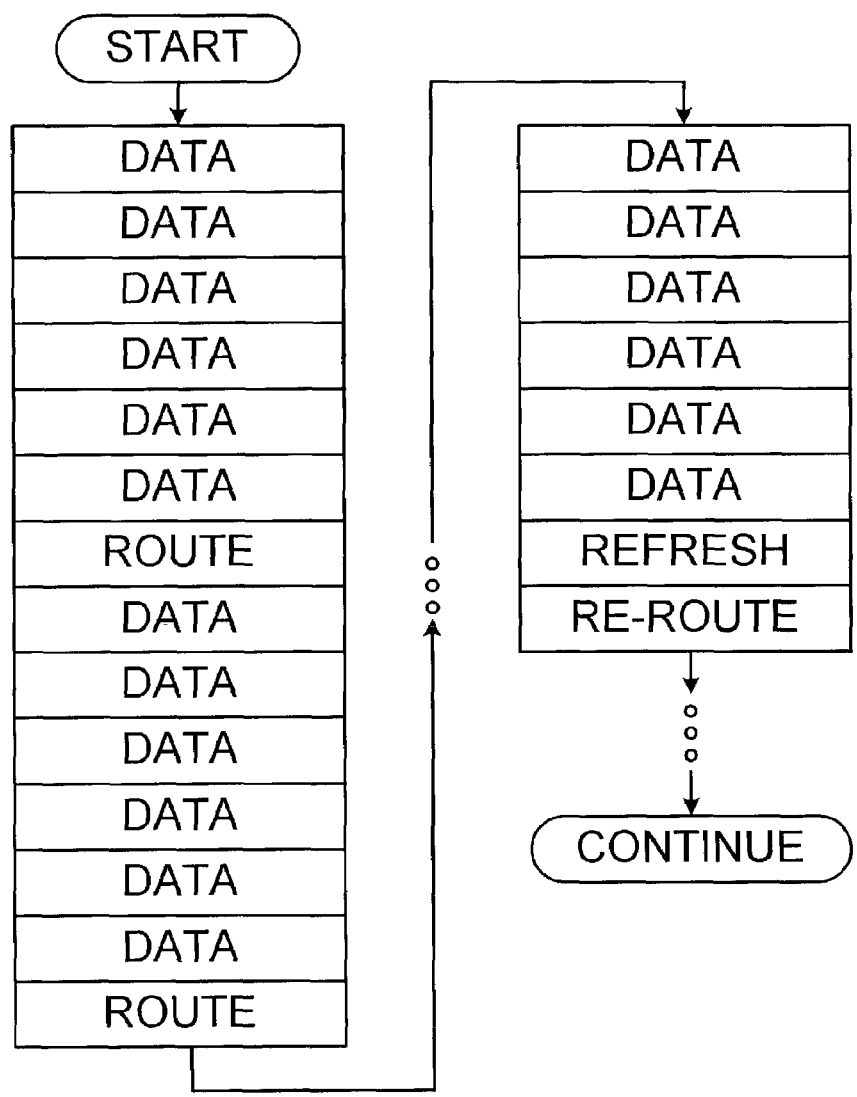

FIG. 8 depicts an illustrative protocol showing a sequence of data transfers that are passed to a gateway in accordance with a specific illustrative embodiment of our invention.

Figure 9:
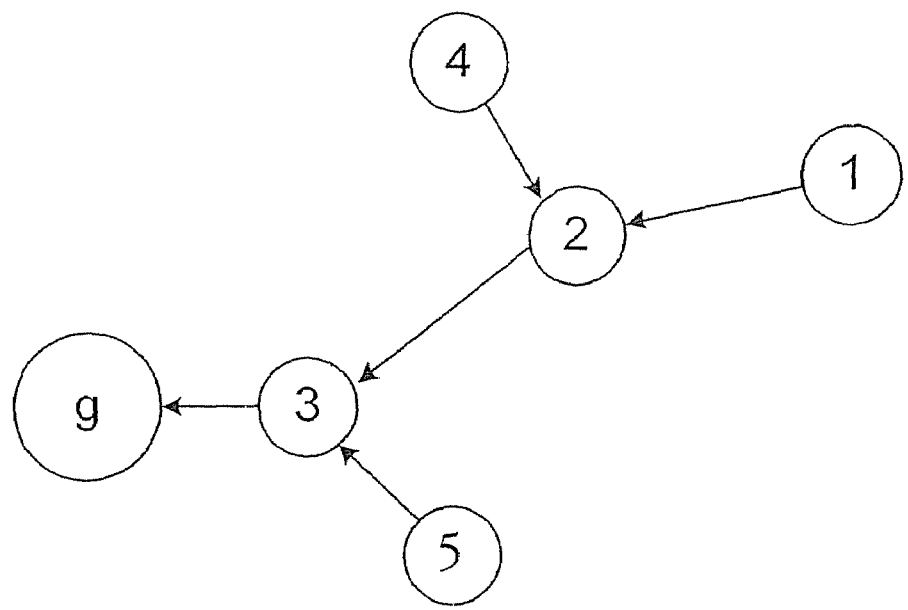

FIG. 9 shows data slot assignments such as those used with a specific illustrative embodiment of our invention.

List of Reference Numbers for the Major Elements in the Drawing

The following is a list of the major elements in the drawings in numerical order.

- 10 first sensor cluster
- 11 command node or processor
- 15 gateway node (first sensor cluster)
- 20 second sensor cluster
- 25 gateway node (second sensor cluster)
- 30 third sensor cluster
- 35 gateway node (third sensor cluster)
- 41 method step - deploying sensors
- 42 method step - determining geographic location of each sensor
- 43 method step - clustering sensors to minimize energy consumption
- 44 method step - forming data routes
- 45 method step - modeling the energy available for each sensor (at the gateway)
- 46 method step - detecting environment and relaying data
- 47 method step - adjusting data routes
- 100 wireless sensor
- 101 receiver (part of sensor)
- 102 transmitter (part of sensor)
- 103 processing circuitry (part of sensor)
- 104 sensing circuitry (part of sensor)
- 105 clock (part of sensor)

DESCRIPTION OF THE INVENTION

Carrying Out the Invention

Referring to FIG. 1, the system architecture of a sensor network is depicted. In this architecture, the individual wireless sensors 100 are grouped into clusters, 10, 20, and 30, controlled by a single command node or processor 11. These wireless sensors 100 are responsible for probing the environment to detect a target or an event. The sensors 100 are typically only capable of short-range radio communication. Every cluster, 10, 20, and 30, has an associated gateway node, 15, 25, and 35, that manages sensors in the cluster and that includes a cluster-wide routing table for its sensors. In one embodiment, the sensors 100 are clustered based on communication range. In other embodiments, the sensors 100 are clustered based on the number, types, and geographic locations of the individual sensors 100.

Sensors receive commands from and send readings to its gateway node, which processes these readings. A gateway node can track events or targets using readings from sensors in any clusters as deemed by the command node. However, sensors that belong to a particular cluster are only accessible via the gateway of that cluster. However, in further embodiments, each gateway routes sensor data from its cluster to other gateways.

The command node or processor 11 is remotely deployed away from the sensors. The command node clusters the entire sensor network and arbitrates jobs among gateways. Gateway nodes, which are significantly less energy-constrained than the sensor, interface the command node with the sensor network via long-haul communication links. The gateway node sends reports generated through fusion of sensor readings, such as, for example, location and bearing of detected targets, to the command node. The command node presents these reports to the user and performs system-level fusion of the collected reports for an overall situation awareness.

Referring now to FIG. 3, each sensor 100 is capable of operating in an active mode or a low-power stand-by mode in which the sensing 104 and processing 103 circuits are powered off; associated with each processing circuit 103 or incorporated therein is a forwarding table for that sensor. In addition both the radio transmitter 102 and receiver 101 of each sensor 100 can be turned on and off independently and the transmission power can be programmed based on the required range. Each sensor 100 can act as a radio relay to forward data from another sensor. Certain of these capabilities, such as a low power standby mode, are available on wireless sensors available in the art, such as an Acoustic Ballistic Module from SenTech Inc.

The on-board clock 105 of each sensor 100 is synchronized with a clock at its associated gateway, 15, 25, and 35. Clock synchronization can be achieved via the use of the global positioning satellite (GPS) system or through the exchange of synchronization messages. Advantageously, the gateway, 15, 25, and 35, of a particular cluster, 10, 20, and 30, manages the sensors within the cluster based on their geographical location, recent sensor readings, remaining sensor's energy and current mission. Specifically the gateway 15, 25, or 35, dynamically reconfigures the sensor network within its cluster, 10, 20, or 30 and directs the sensors to turn on and off their communication and processing circuits. In addition, the gateway collects the readings of a selected subset of the sensors in the cluster and fuses such readings prior to reporting to the command node or processor 11.

Clustering the sensor network allows for the increased role of the gateway in the sensor organization and network management. Organizing the sensors means selecting a minimal set of sensors that has to actively monitor the environment and process sensed signals. Sensor organization is application specific and depends on the sensed data over a period of time. For example, organizing the sensors to accurately track a target depends on the direction and speed of the target. Mechanisms are available to perform such mission-oriented sensor organization.

The gateway node 15, 25, or 35 will act as a cluster-based centralized network manager that sets routes for sensor data, monitors latency throughout the network, and arbitrates medium access among the sensors 100. The gateway 15, 25, or 35 tracks energy usage at every sensor and changes in the mission and the environment. The gateway configures the sensor and the network to operate efficiently in order to extend the life of the network. For example, the gateway 15, 25, or 35 can instruct sensors 100 that are active in sensing and signal processing to transmit at a low power that covers only very short range, and rerouting the network to set up multi-hop routes by instructing other sensors in the vicinity to forward the data.

A medium access control (MAC) mechanism allows sensors to selectively turn off their receivers when not needed. The gateway node tracks resource consumed at the sensors and sets up a deterministic schedule for the sensors to turn on and off their radio transmitters and receivers. In addition, controlling transmitting and receiving circuits also reduces radio interference (noise) among the nodes and thus allows sensors to communicate reliably using low transmission energy and reduces the error rate.

Store-and-forward schemes for wireless networks such as IEEE 802.11 have a sleep mode in which nodes turn off. To avoid the loss of packets while a sensor is in sleep mode, the gateway can act as a buffering interface. Store-and-forward schemes also allow for local retransmissions not involving higher network protocols layers.

An energy-aware protocol sets up and maintains network data routes between sensors that are randomly deployed over an area. A power-aware time division multiple access (TDMA) based MAC protocol coordinates the delivery of data to receivers under the control of the gateway 15, 25, or 35. In our invention, the gateway performs the slot assignment based on its routing decisions. Advantageously, the up-link communication is more frequent than the down-link communication leading to less control overhead and thus higher bandwidth efficiency. The gateway 15, 25, or 35 informs each sensor 100 of its state to set the appropriate mode of operation.

The sensor network is managed with a main objective of extending the life of the sensors in a particular cluster. The system topology is adjusted using routing and media access control (MAC). Sensor's energy is central in deciding on changes to the networking topology and in setting routes. Messages are routed through multi-hop to preserve the transmission energy of the sensors. Latency in data delivery and other QoS attributes are also considered in the routing decision. In addition, message traffic between the sensors and the gateway is arbitrated in time to avoid collision and to allow turning off the sensor radio when not needed.

The gateway nodes 15, 25, and 35 assume responsibility for sensor organization based on missions assigned to every cluster. Thus the gateway will control the configuration of the data processing circuitry of each sensor 100 within the cluster. Advantageously, assigning the responsibility of network management within the cluster to the gateway 15, 25, and 35 increases the efficiency of the usage of the sensor resources. The gateway 15, 25, and 35 can apply energy-aware metrics to the network management based on sensor participation in a current mission and available energy per sensor. Since the gateway 15, 25, and 35 sends configuration commands to sensors, the gateway 15, 25, and 35 has the responsibility of managing transmission time and establishing routes for the outgoing messages. Therefore, managing the network topology for message traffic from the sensors can be seen as a logical extension to the gateway 15, 25, and 35 role, specially all sensor 100 readings are forwarded to the gateway 15, 25, and 35 for fusion and application-specific processing.

Transmission routes between each sensor 100 and its respective gateway nodes 15, 25, or 35 are represented in a table that specifies the path of messages between a sensor or node and another sensor or node. Setting routes for sensor data are performed in a gateway 15, 25, or 35 that knows the cluster topology. Both centralized and distributed routing requires maintenance of the routing table every time the network topology changes. While distributed approaches are scalable for larger networks, updating routing tables and ensuring consistency among the local versions that the sensor nodes has consumed significant computation and communication resources, thus limiting the portion of the already limited sensor's energy that can be dedicated to serve the application. In addition, exchanging routing messages among the sensors will create excessive traffic that drains unnecessary energy since radio receivers of the sensors may overhear the routing message transmissions not destined to them.

On the other hand, our centralized routing scheme, based on clusters is simple and fits the nature of the sensor networks. Since the sensor is committed to data processing and communication, it is advantageous to offload routing decision from the resource-constrained sensor node. In addition, since the gateway 15, 25, or 35 has a cluster-wide view of the network, the routing decisions should be more efficient than the decisions based on local views at the sensor level. Given that the gateway organizes the sensor 100 in the cluster, it can combine the consideration for energy commitments to data processing, remaining sensor energy, sensors' location, acceptable latency in receiving the data and link traffic in setting message routes efficiently. Moreover, knowledge of cluster-wide sensor's status enhances the robustness and effectiveness of media access control because the decision to turn a node's receiver off will be more accurate and deterministic than a decision based on a local MAC protocol. Although centralized routing can bound scalability to large number of sensors in a cluster, more gateways can be deployed. The system architecture promotes the idea of clustering to ensure scalability.

The sensor nodes in a cluster can be in one of four main states: sensing only, relaying only, sensing-relaying, and inactive. In the sensing state, the node's sensing circuitry is on and it sends data to the gateway in a constant rate. In the relaying state, the sensor does not sense the target but its communications circuitry is on to relay the data from other active nodes. When a sensor is both sensing the target and relaying messages from other nodes, it is considered in the sensing-relaying state. Otherwise, the sensor is considered an inactive sensor and can turn off its sensing and communication circuitry. The decision of determining the node's state is done at the gateway based on the current sensor organization, sensor battery levels, and desired network performance measures.

In each cluster, the gateway 15, 25, or 35 uses model-based energy consumption for the data processor 103, radio transmitter 102 and receiver 101 to track the life of the sensor battery 106 as shown in FIG. 3. Periodically, the gateway will adjust its views of the sensor's remaining energy by querying all active sensors for the actual levels of the battery energy. The basic operation of the network consists of two alternating cycles: data cycle and routing cycle.

FIG. 2 shows an example of a typical cluster of a sensor network during a target-tracking mission. During the data cycle, the nodes sensing the target send their data to the gateway. During the routing cycle, the state of each sensor in the network is determined by the gateway and the nodes are then informed about their newly assigned states and how to route the data.

There will be some inaccuracy in the gateway's energy model due to the overhead and data packet dropping. The model approximation is still accepted since we believe that the refreshing updates, together with the fine-tuning of routing parameters, can correct deviations within certain tolerable limits. The high computational overhead at the gateway is also acceptable since it has a far more relaxed power constraint than the sensor nodes. The scalability issue of source routing is addressed using clustering of the network, where each cluster is managed by its gateway node.

Referring to FIGS. 4 and 5, we can generally describe our method steps of routing 44 and rerouting 47 the network as a least-cost routing path optimization problem. This least-cost routing problem is extended to add delay constraints to guarantee end-to-end delay requirements.

FIG. 7 shows how the routing function (steps 44 and 47) of our method can be partially represented by an extended Dijkstra's algorithm. This function can be considered as the transpose of the one-to-some shortest algorithm. To optimize the routing, our objective function needs to consider many other factors, mainly the power conservation and delay reduction. As for the problem of path-constrained routing, the same approach of extended Dijkstra's algorithm can be used while eliminating any infeasible path, which can not satisfy the delay constraint.

Given a cluster of the sensor network, we assume they are connected by bi-directional wireless links with a cost associated with each direction. Each link may have a different cost for each direction due to different energy levels on the nodes at each end. The cost of a path between two sensors is defined as the sum of the costs of the links traversed. For each sensing-enabled node, the routing algorithm should find a least-cost path from this sensor to the gateway. The routing algorithm can find the shortest path from the gateway to the sensing-enabled nodes using the transpose property.

Up to this point, our routing algorithm is almost a typical Dijkstra algorithm. We have extended this algorithm to take into consideration power conservation, delay optimization and other sensor-related properties. First, the cost function for each link is redefined to take into consideration the nature of the sensor network environment. Then, we will define new procedures to customize the routing more for the sensor network environment. Advantageously, our centralized adaptive routing approach reacts to the changing conditions within the network where information is gathered from all nodes under a centralized control.

Referring back to FIGS. 5 and 6, the new link cost function for a wireless network is shown. The step 44 of routing the network consists of building a node-to-node link list that minimizes the cost function shown in FIG. 5. The cost function is a summation of the cost factors required for the link between each two nodes, i and j, The communication cost factor CF1 is a power-related factor that reflects the cost of the wireless transmission power which is directly proportional to the distance raised to an exponential power L that is dependent on the nature of the environment. The closer a transmitting sensor is to a destination gateway, the less its communication cost factor CF1 will be, making that node-to-node link more attractive for routing. The incremental change in transmission power over distance C0 is the power required by the transmission circuitry. Only a small portion of the transmitted signal is received, so the actual transmission power increased exponentially L with distance.

The energy available cost factor CF2 is a power-related factor that favors the nodes with more energy during the routing step 44. The more energy the sensor contains, the better it is for routing. The nodes with abundant energy are expected to last long and, thus increase the reliability to the paths selected for routing. The function F models the available energy in each sensor's battery.

Energy consumption rate cost factor CF3 considers the present energy consumption rate C2, the maximum time that the sensor can function as a sensing sensor MAXTIME, and the expected time Tj at the present consumption rate. The energy consumption rate cost factor CF3 increases when a sensor battery is depleted of energy and disfavors over-used nodes even if they have a lot of energy remaining.

Enabling cost factor CF4 represents the sum of the relaying enabling cost C3 and the sensing enabling cost C4 for each particular sensor. These enabling costs are the energy overhead required to enable the sensor sensing and data relay functions. The enabling cost factor CF4 factor favors using presently enabled versus presently inactive nodes and disfavors using sensing-enabled nodes as relay nodes, since each of these nodes already consume some energy in their sensing circuits. Advantageously, the enabling cost factor CF4 allows the sensor network to consume the minimum amount of power and still allow for maximum target coverage.

Routing cost factor CF5 limits a sensor to a maximum number of connections. An extra cost C5 is used to avoid adding communication paths that exceed the limit of connections per relay. This factor helps to disfavor overloaded relay-enabled nodes in order to extend their lifetimes. Advantageously, the use of a routing cost factor CF5 increases the overall system reliability because nodes that are on more than one transmission are more critical than nodes that are on a single transmission path.

Delay cost factor CF6 considers the speed cost C6 of wireless data transmission. The farther the sensor from the gateway, the more delay it takes the wireless communication to transmit a message from it. The delay cost factor CF6 factor favors closer nodes over more distant nodes.

Queuing cost factor CF7 considers the overall load cost C7, for example, a store and forward process for each message whose route passes through a sensor. The queuing cost factor CF7 factor also considers the overall data message load at a relay node, where the overall load is the total number of sensing-enabled nodes whose data messages are sent via routes through this sensor to the gateway 15, 25, or 35. The queuing cost factor CF7 disfavors the relay nodes with longer queue-lengths, allowing the system to avoid dropping or delaying data packets.

In order to satisfy some network performance metrics in the routing algorithm, the gateway should know the remaining capacity in each node's battery. Instead of requiring each sensor to inform the gateway about its remaining battery capacity, which may consume a lot of battery energy, the gateway maintains an energy model for each node. The gateway updates this model with each packet received by changing the remaining battery capacity for the nodes along the path from the initiating sensor node to the gateway.

The energy model can deviate from the actual sensor battery level due to inaccuracy in the model, packet drop due to communication error, or packet drop due to a buffer overflow at a node. This deviation may lead to inaccuracy in the routing decisions, which may affect the network performance. To compensate for this deviation, the nodes refresh the gateway's energy model periodically (with a low frequency). All nodes, including inactive nodes, send their refresh packets at a pre-specified time and then turn their receivers on at a predetermined time in order to hear the gateway's routing decision. This requires the nodes and gateway to be synchronized as assumed earlier.

If a node's refresh packet is dropped due to communication error, the gateway assumes that the sensor is nonfunctioning during the next cycle, which leads to turning this node off. However, this situation can be corrected in the next refresh. On the other hand, if a routing decision packet from the gateway to a node is dropped, we have two alternatives:

The node can turn itself off. This has the advantage of reducing collisions but may lead to loss of data packet if the node should be in the sensing or relaying state. Missing sensor's data might be a problem unless tolerated via the selection of redundant sensors and/or the use of special data fusion techniques.

The node can maintain its previous state. This can preserve the data packets especially if the node's new state happens to be the same as its old state. However, if this is not the case, the probability of this node's transmissions colliding with other nodes' transmissions increases.

Advantageously, our inventive method includes a rerouting step 47 that can be dynamically adjusted to optimally respond to changes in the sensor organization. For a target tracking sensor network, the selected sensors will vary as the target moves. Changes in the selection of active sensors will have to be accommodated by the routing algorithm in order to ensure that delivery of the sensed data and the proper tracking of the target. In addition, the gateway, 15, 25, or 35 will continuously monitor the available energy level at every sensor that is active in data processing (sensing) or in forwarding data packets (relaying). Rerouting is based on the following three criteria:

1. Sensor reorganization: The gateway may perform rerouting if an event happens that requires the reselection of active sensors.
2. Sensor Battery Energy Level: The gateway may perform rerouting if the battery level of any active sensor drops to a certain level.
3. Energy Model Adjustment: Rerouting can also occur after receiving an updated status from the sensors. Changes to the energy model might affect the optimality of the current routes, and thus new routes have to be generated.

All nodes turn their receiver 101 on at a predetermined time in order to hear the gateway's routing decision and their local routing table (if the node's new state is relaying.) This means that all rerouting should be done at the same predetermined time. In order to conserve the energy of the nodes, especially as the refresh packets are transmitted directly without relaying from nodes to the gateway, the refresh cycle is performed at a low frequency.

Although the new routing protocol is independent of the MAC layer protocol, choosing a certain MAC layer protocol enhances the performance. Recent research results pointed out that the wireless network interface consumes a significant fraction of the total power. Measurements show that on a typical application like web-browser or email, the energy consumed when the interface is on and idle is more than the cost of receiving packets. This is because the interface is generally idle longer than actually receiving packets. Furthermore, switching between states (i.e. off, idle, receiving, transmitting) consumes time and energy. Therefore, in a wireless system the medium access protocols can be adapted and tuned to enhance energy efficiency.

In one embodiment, our inventive method uses a time division multiple access (TDMA) based MAC layer where the slot assignment is managed by the gateway 15, 25, or 35. The gateway 15, 25, or 35 informs each sensor about slots in which it should listen to other nodes' transmission and about slots which the sensor can use for its own transmission.

FIG. 8 shows an example of a typical sequence of phases. The protocol consists of four main phases: data transfer, refresh, event-triggered rerouting, and refresh-based rerouting phase. In the data transfer phase, sensors send their data in the time slots allocated to them. Relays use their forwarding tables to forward this data to the gateway. Inactive sensor nodes remain off until the time for sending a status update or to receive route broadcast messages.

The refresh phase is designated for updating the sensor model at the gateway. This phase is periodic and occurs after multiple data transfer phases. Periodic adjustments to sensors' status enhance the quality of the routing decisions and correct any inaccuracy in the assumed sensor models. During the refresh phase, each sensor in the network uses its pre-assigned slot number to inform the gateway of its status (energy level, state, position, etc). Any sensor that does not send information during this phase is assumed to be nonfunctioning. If the sensor is still functioning and a communication error caused its packet to be lost, its state may be corrected in the next refresh phase. The slot size in this phase is less than the slot size in the data transfer phase as will be explained later.

As previously discussed, rerouting (step 47) is required when a sensor's energy gets below a certain threshold, after receiving a status update from the sensors, or when there is a change in the sensor organization. Since the media access in our approach is time-based, rerouting has to be kept as a synchronous event that can be prescheduled. To accommodate variations in the rate of causes of rerouting, two phases are designated for rerouting and scheduled at different frequencies. The first phase is called event-based rerouting and allows the gateway to react to changes in the sensor organization and to drops in the available energy of one of the sensors below a preset acceptance level. The second rerouting phase occurs immediately after the refresh phase terminates. During both phases, the gateway runs the routing algorithm and sends new routes to each sensor in its pre-assigned slot number and informs each sensor about its new state and slot numbers as shown in Table 1. Given that events might happen at any time and should be handled within acceptable latency, the event-based rerouting phase is scheduled more frequently than the refresh-based rerouting. If there has not been any events requiring messages rerouting, the event-triggered rerouting phase becomes an idle time.

TABLE 1

Summarized Description for MAC Protocol Phases

| Phase | Initiated by | Schedule | Actions |
|---|---|---|---|
| Data send | Active sensors | Assigned time slot | Send or forward data packets |
| Refresh | All sensors | Pre-assigned time slot | Inform gateway of sensor's state (energy level, state, position, etc.) |
| Refresh-based | Gateway | After refresh phase | Setup routes based |

TABLE 1-continued

Summarized Description for MAC Protocol Phases

| Phase | Initiated by | Schedule | Actions |
|---|---|---|---|
| rerouting | | | on updated sensors model. |
| Event-triggered rerouting | Gateway | Periodic | Setup routes to handle changes in sensor selection and energy usage. |

The lengths of the refresh and reroute phases are fixed since each sensor in the sensor network is assigned a slot to use in transmission during the refresh phase and to receive in it during the reroute phases. Similarly, the length of the data transfer phase is fixed. Although the number of active nodes changes from a rerouting phase to another, the length of the data transfer phase should be related to the data sending rate and not to the number of active nodes. If the length of the data transfer phase is dependent on the number of active nodes, then a sensor may consume power while it has nothing to do. It should be noted that during system design the size of the data transfer phase should be determined to accommodate the largest number of sensors that could be active in a cluster. Since the length of all phases is fixed, the period of the refresh and rerouting phases can be agreed upon from the beginning and does not have to be included in the routing packets.

The description for the packets of the corresponding phases is shown in the Table 2. In the data packet used in the data transfer phase includes the originating sensor ID so that the gateway can adjust the energy model for the sender and relay sensors. In addition, the sensor ID identifies the location and context of the sensed data for application-specific processing. The refresh packet includes the most recent measurement of the available energy. In a preferred embodiment, the sensors 100 are mobile and can be moved to new geographic locations as required by a particular mission.

TABLE 2

Description of the various packet types

| Source | Destination | Type | Contents |
|---|---|---|---|
| Sensor | Gateway | Data | ID of originating node<br>* Data payload |
| Sensor | Gateway | Refresh | * ID of originating node<br>Source node's battery level<br>* Coordinates of source sensor (optional) |
| Gateway | "Inactive" Sensor | Rerouting | * ID of destination node |
| Gateway | "Sensing" Sensor | Rerouting | * ID of destination node<br>Data send rate<br>Transmission range<br>Time slots for sending data |
| Gateway | "Relaying" Sensor | Rerouting | * ID of destination node<br>* Forward table<br>* Time slots for sending data |

The content of a routing packet depends on the new state of the recipient sensor node. If a sensor 100 is inactive, the packet simply includes the ID of the destination node. If a sensor 100 is set to sense the environment, the packet includes the data sending rate and the time slots during which these data to be sent. In addition, the nodes that are to be set for sensing will be told the transmission range, which the sensor has to cover. Basically the transmission power should be enough to reach the next relay on the path from this sensor to the gateway, as specified in the routing algorithm. Relay sensors will receive the forwarding table that identifies where data packet to be forwarded to and what transmission to be covered.

The forwarding table consists of ordered pair of the form: (time slot, data-originating node, and transmission range). The "time slot" entry specifies when to turn the receiver on in order to listen for an incoming packet. The "source node" is the sensor that originated this data packet, and "transmission power" is the transmission power to use to send the data. This transmission power should be enough to reach the next relay on the path from the originating sensor to the gateway. It should be noted that the intermediate sensors on the data routes are not specified. Thus, it is sufficient for the relaying nodes to know only about the data-originating node. The transmission range ensures that the next relay node, which is also told to forward that data packet, can clearly receive the data packet and so on. Such approach significantly simplifies the implementation since the routing table size will be very small to maintain and the changes to the routes will be quicker to communicate with the sensors. Such simplicity is highly desirable to fit the limited computational resources that sensors would have. We rely on the sensor organization and smart data fusion to tolerate lost data packets by allocating redundant sensors and applying analytical techniques.

The slot sizes for the refresh and reroute phases are equal since they cover all sensor nodes in the cluster. Both slots are smaller than the slot for the data transfer phase. This is due to two reasons. First, the routing packet is typically less than the data packet. Second, during the data transfer phase many nodes are off which motivates larger slot sizes In the other phases, all nodes must be on and communicating with the gateway. To avoid collision while packets are in transient, the slot size in the refresh and reroute phases should be equal the time required to send a routing packet with maximum length plus the maximum propagation time in the network, as calculated by the gateway. The slot size in the data transfer phase equals the time required to send a data packet with maximum length plus the maximum propagation time in the network.

Refer now to FIG. 9, which shows an example of slot assignment in accordance with our invention. Slot assignment is performed by the gateway and informed to the nodes during the rerouting phases. Different algorithms can be used for slot assignment. Currently, we assign each sensor a number of slots for transmission based on its current load. This slot assignment is contiguous. Nodes 1, 4, and 5 acts as sensor so they are assigned one slot for transmitting their data. Sensor 2 serves as a relay for sensors 1 and 4, so it is assigned two slots. Sensor 3 acts as a sensor and a relay. It is assigned one slot for transmitting its own sensor data and 3 slots to relay other sensor packets. In this example, the gateway informs each sensor of the slots it is going to receive packets from other sensors and the slots it can use to transmit the packets. For example, the gateway informs sensor 3 that it should turn its receiver on in time slots 2-4

(corresponding to the transmission slots of nodes 2 and 5) to receive packets and that it can use time slots 5-8 to transmit its packets.

It should be noted here that the contiguous slot assignment algorithm might lead to instantaneous buffer overflow. For example, if sensor 3 in FIG. 9 has only a buffer for two packets, then it can happen that it receives, in slots 2-4, three packets from nodes 2 and 5. This may lead to packet drop due to buffer overflow. However, if transmission and receiving slots were interleaved, this overflow cannot happen.

List of Acronyms Used in the Detailed Description of the Invention

The following is a list of the acronyms used in the specification in alphabetical order.

| | |
|---|---|
| GPS | global positioning satellite |
| MAC | media access control |
| QoS | quality of service |
| TDMA | time division multiple access |

Alternate Embodiments

Alternate embodiments may be devised without departing from the spirit or the scope of the invention. For example, the individual sensors and the gateway can be mobile instead of stationary.

What is claimed is:

1. A method of building and managing a network including nodes of wireless sensors (100), wherein each sensor is configured to detect environmental parameters, receive digital data, transmit digital data and relay digital data received from another sensor, said method comprising the steps of:
   (a) deploying (step 41) the sensors over a predetermined geographical area;
   (b) determining (step 42) the geographic location of each sensor;
   (c) grouping (step 43) the sensors into one or more clusters, wherein each of the one or more clusters further includes a gateway that is responsible for relaying data from each sensor in the respective cluster to a control node (11);
   (d) in each of the one or more clusters, setting (step 44) network data routes from among a plurality of topologically-possible routes between each sensor of the cluster and the gateway in the cluster so as to minimize energy consumption using a cluster-wide routing table at the gateway in the cluster and smaller local forwarding tables at the sensors of the cluster, said routing and forwarding tables determining
      (i) whether each sensor will transmit and receive data, either directly from the gateways of the cluster or indirectly with the gateway of the cluster via relaying from a specific plurality of other of said sensors of the cluster,
      (ii) whether each sensor will relay data between the gateway in the cluster and any other sensor of the cluster;
      (iii) whether each sensor will relay data between any two other sensors of the cluster; and
      (iv) when each sensor of the cluster will transmit and receive data;
   (e) modeling (step 45) energy available at each sensor by using a mathematical equation, where said equation considers an amount of time that the sensor is performing various functions and an amount of energy each function consumes, said various functions comprising
      (i) the detection of environmental parameters,
      (ii) the reception of digital data, and
      (iii) the transmission of digital data;
   (f) detecting (step 46) environmental parameters and relaying data to the control node; and
   (g) re-setting (step 47) the network data routes to compensate for changes in the amount of energy available at each sensor.

2. The method recited in claim 1, wherein the step of setting (step 44) network data routes minimizes a total cost function for the network, wherein the total cost function further comprises the following cost factors:
   (a) a communication cost factor (CF1);
   (b) a remaining energy available cost factor (CF2) that favors network nodes with more energy or those with less energy;
   (c) an energy consumption rate cost factor (CF3) that disfavors using sensing-enabled nodes as relay nodes;
   (d) an enabling cost factor (CF4) that favors using presently enabled versus presently inactive nodes and disfavors using sensing-enabled nodes as relay nodes; and
   (e) a routing cost factor (CF5) that avoids adding communication paths that exceed a predetermined maximum.

3. The method recited in claim 1, wherein the step re-setting (step 47) the network data routes is based on the following three criteria:
   (a) a sensor reorganization, when an event occurs that requires the reselection of active sensors;
   (b) a change in sensor battery level; and
   (c) an adjustment to said mathematical equation that models the energy at a sensor.

4. A method of managing a network including nodes of wireless sensors (100), wherein each sensor is configured to detect environmental parameters, receive digital data, transmit digital data and relay of digital data received from another sensor, said method comprising the steps of:
   (a) setting (step 44) network data routes to minimize energy consumption by creating a table that details interconnectivity of the network where said interconnectivity defines for each of the various sensors
      (i) whether that sensor will transmit and receive data either directly from a specific gateway node or indirectly with said gateway node via relaying from a specific plurality of other of said sensors,
      (ii) whether that sensor will relay data between a specific gateway node and any other of said sensors;
      (iii) whether that sensor will relay data between any two other of said sensors; and
      (iv) when that sensor will transmit and receive data;
   (b) modeling (step 45) energy available at each sensor by using a mathematical equation, where said equation considers an amount of time that the sensor is performing various functions and an amount of energy each function consumes, said various functions comprising
      (i) the detection of environmental parameters,
      (ii) the reception of digital data, and
      (iii) the transmission of digital data;
   (c) detecting (step 46) environmental parameters and relaying data to a control node; and
   (d) re-setting (step 47) the network data routes to compensate for changes in the amount of energy available at each sensor.

5. A system for managing a network of sensors, said system comprising:

(a) a plurality of sensors, each sensor configured to detect environmental parameters, and each respective sensor including a table that determines if the respective sensor will relay data between any two of the other sensors, said sensors being arranged in one or more clusters;

(b) a gateway associated with each of said clusters and receiving sensor data from the sensors in its cluster, said gateway including a table that details interconnectivity of the sensors in its cluster, models energy available at each of its sensors using a mathematical equation, where said equation considers an amount of time the sensor is performing various functions and an amount of energy each function consumes, and transmits control signals to its sensors to change the connections of its sensors in accordance with changes in the amount of energy available at said sensors; and (c) a control processor for receiving sensor data from each gateway.

6. The system of claim 5, said various functions comprising:

the detection of environmental parameters;
the reception of digital data; and
the transmission of digital data.

* * * * *